United States Patent [19]

Kawauchi

[11] Patent Number: 4,594,293
[45] Date of Patent: Jun. 10, 1986

[54] CLAD MATERIAL WITH UNHEATED WELDING ADHESION

[75] Inventor: Toru Kawauchi, Hiroshima, Japan

[73] Assignee: Mitsubishi Jukogyo Kabushiki Kaisha, Tokyo, Japan

[21] Appl. No.: 716,381

[22] Filed: Mar. 27, 1985

[30] Foreign Application Priority Data

Apr. 2, 1984 [JP] Japan .................................. 59-63220

[51] Int. Cl.$^4$ .............................................. B22F 7/02
[52] U.S. Cl. .................................... 428/548; 428/555; 428/554; 417/66
[58] Field of Search ....................... 428/548, 544, 555; 417/66

[56] References Cited

U.S. PATENT DOCUMENTS

| 2,723,204 | 11/1955 | Pottberg et al. | 428/548 X |
| 3,164,448 | 1/1965 | Pottberg | 428/555 |
| 3,652,235 | 3/1972 | Manilla et al. | 428/554 X |

FOREIGN PATENT DOCUMENTS

| 2448738 | 4/1976 | Fed. Rep. of Germany | 428/548 |
| 628679 | 9/1949 | France | 428/548 |

Primary Examiner—Peter A. Nelson
Attorney, Agent, or Firm—Holman & Stern

[57] ABSTRACT

A clad material which is characterized by interposing, between two or more materials to be clad, an intermediate substance comprising one or more kinds of metallic fine powders having improvement properties of adhesive strength.

9 Claims, 2 Drawing Figures

CLAD MATERIAL WITH UNHEATED WELDING ADHESION

BACKGROUND OF THE INVENTION (a) Field of the Invention

The present invention relates to a novel clad material.

(b) Description of the Prior Art

Purposes of cladding materials are to bring two or more composite functions into a clad material, to reduce costs of the materials and the like.

As methods for manufacturing the clad materials, there have heretofore been employed pressure welding processes such as a casting process and an explosive welding process, a welding process with padding, a brazing process and the like. These methods, except for the brazing process, make use of heating at a high temperature and application of a stress and require annealing for removal of the stress as a post-treatment, so that each of the methods has a number of processing steps and thus takes high costs. Further, with regard to the brazing method, a fitting operation inconveniently is necessary as a pretreatment.

SUMMARY OF THE INVENTION

The present invention intends to provide a clad material which can be prepared in accordance with a more simplified pretreatment and post-treatment, at a higher treatment speed and at a lower cost as compared with conventional ones.

That is to say, the gist of the present invention resides in a clad material which is characterized by interposing, between two or more materials to be clad, an intermediate substance comprising one or more kinds of metallic fine powders having improvement properties of adhesive strength.

DETAILED DESCRIPTION OF THE INVENTION

Figure 1:
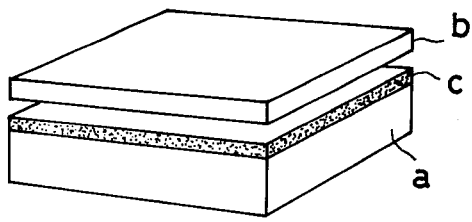
FIG. 1 is a constitutional view of a clad material of the present invention.

One example of the structure of a clad material according to the present invention is shown in FIG. 1. Between plate materials a and b to be clad, a metallic powder layer c having improvement properties of adhesive strength is interposed, and a cladding operation is then carried out in an ultrasonic welding manner.

Examples of usable metallic powders for the metallic powder layer c include powders of one or more metals such as aluminum, nickel, brass, beryllium and platinum. These metallic powders each possess a great surface energy because of having a large surface area for its volume, and scarcely restrain the movement of atoms because of their small solid size. Such properties of the metallic powder permit facilitating an elastic and plastic deformation on the boundary surface between the plate materials a and b, and heightening an adhesive strength therebetween.

The present invention is characterized as follows: When the flat material having an optional thickness or the plate material a having a great curvature is clad with the optional material b having a thickness of 0.01 to 50 mm by means of a welding method, for example, an ultrasonic welding technique, the metallic powder is first dissolved in a suitable solvent such as a lacquer, a paint, a varnish, a synthetic resin liquid or water; the plate material a or b is then coated with the thus prepared solution; and they adhere to each other to build up an adhesive strength therebetween.

The above-mentioned usable metallic powder is preferably from 5 to 50 $\mu$m in grain size. This lower limit is a value at which the powder does not bring about aggregation and coarsening, and the aforesaid upper limit is decided taking, into consideration, a limit of a thickness of the intermediate substance. The thickness of the intermediate substance can suitably be selected in view of the grain size of the metallic powder, and for example, it is within the range of 5 to 50 $\mu$m.

The clad materials of the present invention which have the above-mentioned construction can be applied to (1) composite materials of metals, for example, liners (steel+copper alloy), bearing materials, stellite-stuck products, (2) composite materials of metals and ceramics and (3) composite materials of ceramics.

Now, the present invention will be described in accordance with an example.

EXAMPLE

By means of an ultrasolinic welding machine, a brass plate (Cu-Zn) having a thickness of 2 mm, an SUS plate having a thickness of 2 mm and a stellite plate (a tool material comprising 45% of Co, 30% of Cr and 15% of W) having a thickness of 1 mm were joined to S45C (Carbon Steel for Machine Structural Use; JIS G4051) plates each having a thickness of 9 mm. This joining operation was carried out under a pressure of 0.5 to 30.0 kg/mm$^2$ in the presence of an ultrasonic wave (output=500 to 5,000 W and excitation time=0.1 to 4.0 seconds).

Shear tests were carried out for spot welded portions, and the results are set forth in Table 1. With regard to articles of the present invention in which aluminum, nickel and brass powders each having a grain size of about 10 $\mu$m were used as intermediate substances, adhesive strength was more improved as much as 10 to 40% as compared with conventional articles each containing no intermediate substance. In this case, the metallic powders of aluminum and the like were each dissolved in a lacquer as a solvent and were each applied twice or three times onto the surface of each metallic plate by the use of a brush.

TABLE 1

| | Shear strength per point (kg/cm$^2$) | | |
|---|---|---|---|
| Inter. substance | S45C + CuZn | S45C + SUS | S45C + stellite |
| Conventional article | | | |
| None | 479 | 450 | 406 |
| Articles of the present invention | | | |
| Al powder | 600 | 509 | — |
| Ni powder | 671 | 530 | — |
| Cu—Zn powder | 530 | 497 | 458 |

Figure 2:
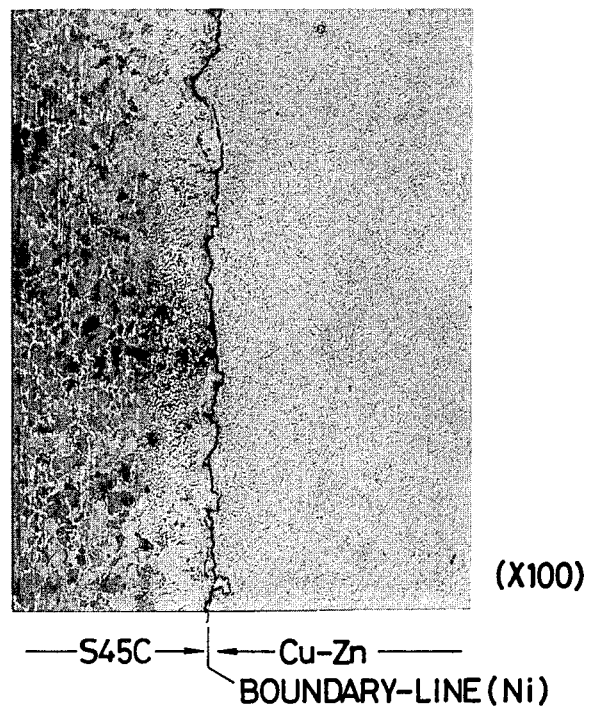
FIG. 2 is a photomicrography (magnification 100×) showing a metallic construction containing a boundary state in one embodiment of the clad material of the present invention.

Moreover, FIG. 2 is a photomicrography (magnification 100×) showing a boundary state between the S45C plate and the brass plate with the interposition of the intermediate substance comprising the nickel powder.

I claim:

1. A clad material being an unheated welding adhesion from an aqueously interspersed powder of one or more metals, said powder being of a grain size which avoids aggregation and coarsening and forms adhesive bonding between two or more materials to be clad under unheated welding conditions.

2. The clad material according to claim 1 wherein said powder is at least one selected from the group consisting of aluminum, nickel, brass, beryllium and platinum.

3. A clad material prepared by a process comprising interspersing an aqueous metallic composition between two or more materials to be clad and then subjecting said composition to unheated welding means resulting in adhesion of said materials.

4. The clad material of claim 3 wherein said metallic composition comprises fine powder of one or more metals dissolved in a solvent.

5. The clad material of claim 4 wherein said fine powder has a grain size ranging from 5 to 50 $\mu$m.

6. The clad material of claim 5 wherein said fine powder of metals is selected from the group consisting of aluminum, nickel, brass, beryllium, platinum or mixtures thereof.

7. The clad material of claim 6 wherein said solvent is selected from the group consisting of lacquer, paint, varnish, synthetic resin liquid and water.

8. The clad material of claim 7 wherein said welding means is an ultrasonic wave.

9. The clad material of claim 8, wherein said ultrasonic wave has an output of 500 to 5,000 W, excitation time being 0.1 to 4 seconds and a pressure of 0.5 to 30 kg/mm being applied to said materials to be clad.

* * * * *